US009407445B2

(12) United States Patent  (10) Patent No.: US 9,407,445 B2
Stewart et al.  (45) Date of Patent: *Aug. 2, 2016

(54) SECURITY SYSTEM AND METHOD

(71) Applicant: Dominic Kotab, San Jose, CA (US)

(72) Inventors: Roger Green Stewart, Morgan Hill, CA (US); Daniel Noah Paley, Redwood City, CA (US)

(73) Assignee: Dominic M. Kotab, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/586,736

(22) Filed: Dec. 30, 2014

(65) Prior Publication Data

US 2015/0113274 A1  Apr. 23, 2015

Related U.S. Application Data

(60) Division of application No. 13/550,422, filed on Jul. 16, 2012, now Pat. No. 9,071,447, which is a continuation of application No. 12/882,103, filed on Sep. 14, 2010, now Pat. No. 8,249,251, which is a division of application No. 10/902,683, filed on Jul. 28, 2004, now Pat. No. 7,818,572.

(60) Provisional application No. 60/528,148, filed on Dec. 9, 2003.

(51) Int. Cl.
*G06F 21/00* (2013.01)
*H04L 9/32* (2006.01)
*H04L 29/06* (2006.01)
*H04L 29/08* (2006.01)

(52) U.S. Cl.
CPC .......... *H04L 9/3271* (2013.01); *H04L 63/0428* (2013.01); *H04L 67/02* (2013.01); *H04L 2209/805* (2013.01)

(58) Field of Classification Search
CPC ............... G06F 1/06; G06F 7/58; H04L 9/18; H04L 9/22; H04L 9/28
See application file for complete search history.

(56) References Cited

U.S. PATENT DOCUMENTS

| 4,218,738 | A | 8/1980 | Matyas et al. |
| 4,310,720 | A | 1/1982 | Check, Jr. |
| 4,649,233 | A | 3/1987 | Bass et al. |
| 5,020,105 | A | 5/1991 | Rosen et al. |
| 5,341,426 | A | 8/1994 | Barney et al. |
| 5,351,293 | A | 9/1994 | Michener et al. |
| 5,469,507 | A | 11/1995 | Canetti et al. |
| 5,606,322 | A | 2/1997 | Allen et al. |
| 5,784,463 | A | 7/1998 | Chen et al. |
| 5,790,667 | A | 8/1998 | Omori et al. |
| 5,841,864 | A | 11/1998 | Klayman et al. |
| 5,970,148 | A | 10/1999 | Meier |
| 5,991,407 | A | 11/1999 | Murto |

(Continued)

OTHER PUBLICATIONS

Schmidt et al., "Enabling Implicit Human Computer Interaction A Wearable RFID-Tag Reader," IEEE, The Fourth International Symposium on Wearable Computers, Oct. 2000, 2 pages.

(Continued)

*Primary Examiner* — Izunna Okeke
(74) *Attorney, Agent, or Firm* — Zilka-Kotab, PC

(57) ABSTRACT

A method for exchanging data according to one embodiment includes transmitting a packet of data from a first device to a second device, the packet of data comprising an unencrypted command and an encrypted payload.

18 Claims, 9 Drawing Sheets

(56) References Cited

U.S. PATENT DOCUMENTS

| | | | |
|---|---|---|---|
| 6,061,449 | A | 5/2000 | Candelore et al. |
| 6,073,236 | A | 6/2000 | Kusakabe et al. |
| 6,105,133 | A | 8/2000 | Fielder et al. |
| 6,516,414 | B1 | 2/2003 | Zhang et al. |
| 6,550,008 | B1 | 4/2003 | Zhang et al. |
| 6,696,879 | B1 | 2/2004 | Tuttle et al. |
| 6,757,832 | B1 | 6/2004 | Silverbrook et al. |
| 7,155,172 | B2 | 12/2006 | Scott |
| 7,818,572 | B2 | 10/2010 | Stewart et al. |
| 8,249,251 | B2 | 8/2012 | Stewart et al. |
| 9,071,447 | B2 | 6/2015 | Stewart et al. |
| 2003/0072059 | A1 | 4/2003 | Thomas et al. |
| 2004/0066278 | A1 * | 4/2004 | Hughes .................. G06F 21/31 340/10.1 |
| 2004/0193664 | A1 | 9/2004 | Shimasaki |
| 2004/0222878 | A1 | 11/2004 | Juels |
| 2005/0058292 | A1 | 3/2005 | Diorio et al. |
| 2005/0078498 | A1 | 4/2005 | Waters et al. |
| 2005/0123133 | A1 | 6/2005 | Stewart et al. |
| 2011/0002462 | A1 | 1/2011 | Stewart et al. |
| 2012/0281830 | A1 | 11/2012 | Stewart et al. |

OTHER PUBLICATIONS

Schneier, B., "Applied Cryptography, Second Edition: Protocols, Algorithms, and Source Code in C," John Wiley & Sons, Inc., 1996, 3 pages.

Uner, E., "Generating Random Numbers," EE Times—India, Jun. 2004, pp. 1-5.

International Search Report and Written Opinion from PCT Application No. PCT/US04/41286, dated Jun. 15, 2006.

Requirement for Restriction from U.S. Appl. No. 10/902,683, dated Mar. 31, 2008.

Non-Final Office Action from U.S. Appl. No. 10/902,683, dated Jul. 9, 2008.

Non-Final Office Action from U.S. Appl. No. 10/902,683, dated Feb. 26, 2009.

Final Office Action from U.S. Appl. No. 10/902,683, dated Nov. 12, 2009.

Notice of Allowance from U.S. Appl. No. 10/902,683, dated Jun. 14, 2010.

Non-Final Office Action from U.S. Appl. No. 12/882,103, dated Aug. 9, 2011.

Notice of Allowance from U.S. Appl. No. 12/882,103, dated Apr. 16, 2012.

Non-Final Office Action from U.S. Appl. No. 13/550,422, dated Mar. 13, 2013.

Non-Final Office Action from U.S. Appl. No. 13/550,422, dated Sep. 18, 2013.

Non-Final Office Action from U.S. Appl. No. 13/550,422, dated May 20, 2014.

Final Office Action from U.S. Appl. No. 13/550,422, dated Oct. 14, 2014.

Advisory Action from U.S. Appl. No. 13/550,422, dated Jan. 27, 2015.

Notice of Allowance from U.S. Appl. No. 13/550,422, dated Feb. 27, 2015.

Stewart et al., U.S. Appl. No. 10/902,683, filed Jul. 28, 2004.
Stewart et al., U.S. Appl. No. 12/882,103, filed Sep. 14, 2010.
Stewart et al., U.S. Appl. No. 13/550,422, filed Jul. 16, 2012.

* cited by examiner

SECURITY SYSTEM AND METHOD

RELATED APPLICATIONS

This application is a divisional of U.S. patent application Ser. No. 13/550,422 filed Jul. 16, 2012, which is a continuation of U.S. patent application Ser. No. 12/882,103 filed Sep. 14, 2010, which is a divisional of U.S. patent application Ser. No. 10/902,683 filed Jul. 28, 2004, which claims priority to U.S. Provisional Patent Application No. 60/528,148, filed Dec. 9, 2003, from all of which priority is claimed and which are all incorporated by reference.

FIELD OF THE INVENTION

The present invention relates to data security, and more particularly, this invention relates to methods and circuits for secure transmission of data.

BACKGROUND OF THE INVENTION

Automatic identification ("Auto-ID") technology is used to help machines identify objects and capture data automatically. One of the earliest Auto-ID technologies was the bar code, which uses an alternating series of thin and wide bands that can be digitally interpreted by an optical scanner. This technology gained widespread adoption and near-universal acceptance with the designation of the universal product code ("UPC") —a standard governed by an industry-wide consortium called the Uniform Code Council. Formally adopted in 1973, the UPC is one of the most ubiquitous symbols present on virtually all manufactured goods today and has allowed for enormous efficiency in the tracking of goods through the manufacturing, supply, and distribution of various goods.

However, the bar code still requires manual interrogation by a human operator to scan each tagged object individually with a scanner. This is a line-of-sight process that has inherent limitations in speed and reliability. In addition, the UPC bar codes only allow for manufacturer and product type information to be encoded into the barcode, not the unique item's serial number. The bar code on one milk carton is the same as every other, making it impossible to count objects or individually check expiration dates.

Currently cartons are marked with barcode labels. These printed labels have over 40 "standard" layouts, can be misprinted, smeared, mis-positioned and mis-labeled, transit, these outer labels are often damaged or lost. Upon receipt, the pallets typically have to be broken-down and each case scanned into an enterprise system. Error rates at each point in the supply chain have been 4-18% thus creating a billion dollar inventory visibility problem. Only with radio frequency identification ("RFID") does the physical layer of actual goods automatically tie into software applications, to provide accurate tracking.

The emerging RFID technology employs a radio frequency ("RF") wireless link and ultra-small embedded computer chips, to overcome these barcode RFID technology allows physical objects to be identified and tracked via these wireless "tags". It functions like a bar code that communicates to the reader automatically without needing manual line-of-sight scanning or singulation of the objects, RFID promises to radically transform the retail, pharmaceutical, and transportation industries.

The advantages of RFIDs over bar code are summarized in Table 1:

TABLE 1

| Barcode | RFID |
| --- | --- |
| Need line-of-sight to read | Identification without visual contact |
| Read only | Able to read/write |
| Only a barcode number | Able to store information in tag |
| Barcode number is fixed | Information can be renewed anytime |
| Category level tagging only-no unique item identifier | Unique item identification |
| Unable to read if barcode is damaged | Can withstand harsh environment |
| Use once | Reusable |
| Low cost | Higher cost |
| Less Flexibility | Higher Flexibility/Value |

As shown in FIG. 1, an RFID system 100 includes a tag 102, a reader 104, and an optional server 106. The tag 102 includes an IC chip and an antenna. The IC chip includes a digital decoder needed to execute the computer commands the tag 102 receives from the tag reader 104. The IC chip also includes a power supply circuit to extract and regulate power from the RF reader; a detector to decode signals from the reader; a transmitter to send data back to the reader; anti-collision protocol circuits; and at least enough EEPROM memory to store its EPC code.

Communication begins with a reader 104 sending out signals to find the tag 102. When the radio wave hits the tag 102 and the tag 102 recognizes the reader's signal, the reader 104 decodes the data programmed into the tag 102. The information is then passed to a server 106 for processing. By tagging a variety of items, information about the nature and location of goods can be known instantly and automatically.

The system uses reflected or "backscattered" radio frequency (RF) waves to transmit information from the tag 102 to the reader 104. Since passive (Class-1 and Class-2.) tags get all of their power from the reader signal, the tags are only powered when in the beam of the reader 104.

The Auto ID Center EPC-Compliant tag classes are set forth below:
Class-1
Identity tags (RE user programmable, maximum range 3 m)
Lowest cost (ADC Targets: 5¢ moving down to 2¢ in trillion-unit/yr volumes)
Class-2
Memory tags (8 bits to 128 Mbits programmable at maximum 3 m range)
Security & privacy protection
Low cost (AIDC Targets: typically 10¢ at billion-unit volumes)
Class-3
Battery tags (256 bits to 64 Kb)
Self-Powered Backscatter (internal clock, sensor interface support)
100 meter range
Moderate cost (Targets: $50currently, $5 in 2 years, 20¢ at billion-unit volumes)
Class-4
Active tags
Active transmission (permits tag-speaks-first operating modes)
Up to 30,000 meter range
Higher cost (Targets: $10 in 2 years, 30¢ in billion-unit volumes)

Semi-passive and active tags have a battery to provide power to the chip. This greatly increases read range, and the reliability of tag reads, because the tag doesn't need power from the reader. Class-3 tags only need a 10 mV signal from the reader in comparison to the 500 mV that a Class-1 tag needs to operate. This 2,500:1 reduction in power requirement permits Class-3 tags to operate out to a distance of 100 meters or more compared with a Class-1 range of only about 3 meters.

Use of tags presents certain challenges. One particularly pervasive challenge has been providing data security without requiring complex processing and memory capabilities. For instance, unsecure data exchanged between the tag and reader is exposed to eavesdroppers. Moreover, a rogue reader can not only read the tag, but also extract information therefrom and even change or disable the tag.

Security schemes have become more complex in an attempt to thwart hackers. However, with the increased complexity come other requirements, including increased processing power and the resultant increased power demands. The important factors for any RFID implementation are power, cost and speed. The system can only use functionality up to what each side can handle. So while the reader can handle more complex functions, tag capabilities are limited by power and the need for small, low-cost chips.

Therefore it would be desirable to create an encryption scheme that is simple yet secure and reliable.

It would also be desirable to provide security that does not require a secure environment for the exchange of data.

It would also be desirable to provide security that uses "resources" already residing within the tag/reader.

It would also be desirable to provide security that implements some combination of security and authentication.

SUMMARY OF THE INVENTION

The present invention provides methodology and circuitry for secure data transmission that is fast and secure, and that can be implemented with a minimum amount of hardware.

A method for exchanging data according to one embodiment includes transmitting a packet of data from a first device to a second device, the packet of data comprising an unencrypted command and an encrypted payload. Systems and computer program products implementing the method are also herein disclosed.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

Figure 1:
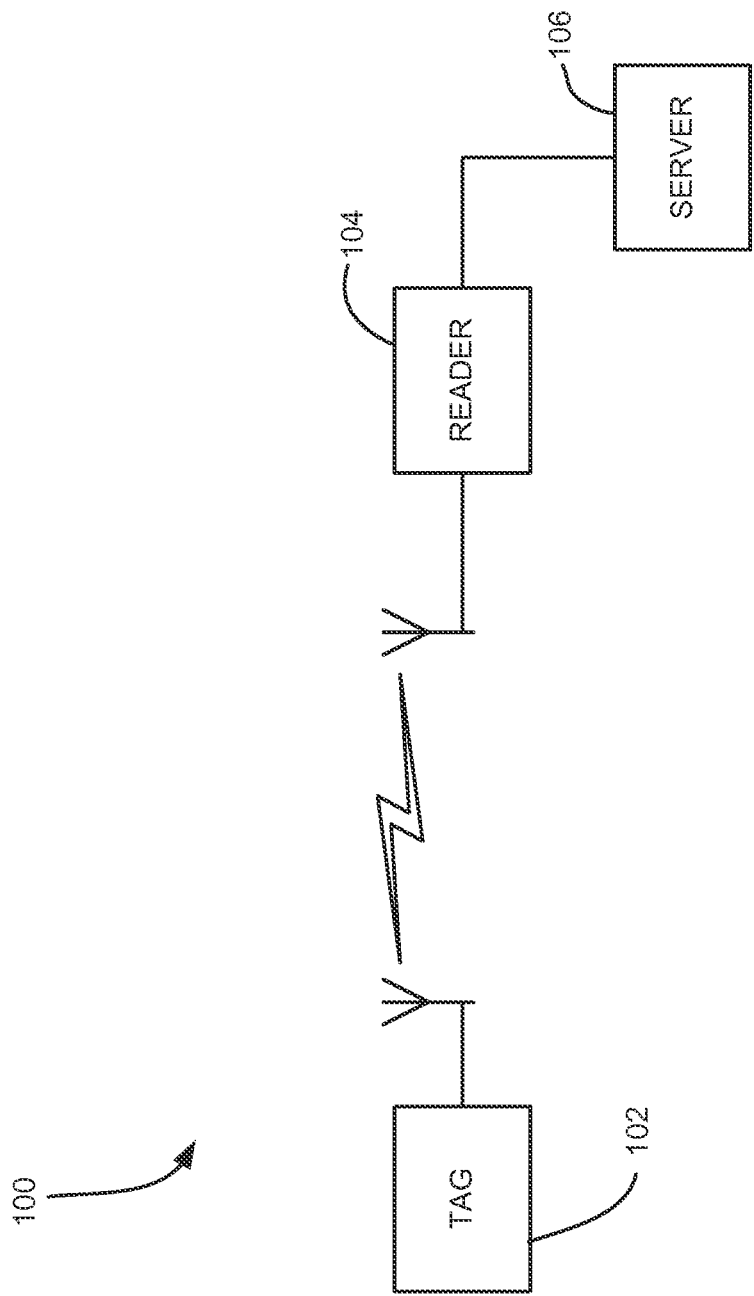
FIG. 1 is a system diagram of an RFID system.

The following description is the best embodiment presently contemplated for carrying out the present invention. This description is made for the purpose of illustrating the general principles of the present invention and is not meant to limit the inventive concepts claimed herein.

The present invention disclosed herein is best described as a secret key, exchanged random key encryption system. In describing the method and device for its implementation, examples will be provided. These examples are not intended to be an exhaustive description of each potential configuration, but to show how one potential circuit may be configured. Variables may have initial conditions, which when chosen, have better results than other initial values. These variables and configurations are for illustration purpose only, and do not suggest the only values which may be utilized.

The present invention allows a plain message, in a known and unencrypted form to be modified in a known way such that a cipher message is generated. This cipher message is intended to allow a secure method for transmission through open channels. A potential use would be to allow private conversations (device to device) over a public medium (such as radio frequency RF) of but not limited to, commands, data streams, and text messages. It is described as a serial to serial transmission medium. It may also be used for other types of transmission mediums such as parallel transmission). Additionally, the principles and circuitry set forth herein are applicable to any type of system where a first device communicates with a second device. For example, the devices can include computers, telephones, personal digital assistants ("PDAs") and other handheld devices, digital cameras, combinations thereof, etc. However, for simplicity, much of the description shall refer to an RFID system in which a reader communicates with one or more RFID tags.

Used in this document are terms which need defining. These definitions are used as an example and to aid in discussion. There are in no way exhaustive in their description and should be understood as such.

Plain text or Plain message: is a body of information, in a known format, which is understood by both the transmitting party and the receiving party. It may also be understood by any unknown third party who is able to observe the information.

Encrypted text or encrypted message: is a body of information, in a scrambled format, which is only understood by the transmitting and receiving parties. Any third party who may view the information should not be able to understand the content, thus, keeping the information secret.

Shared Password (Secret Code): Selected blocks of information of known length and content which have been passed from the transmitter to the receiver in a previously secure manner and is not open to scrutiny of third parties. This information forms the basis of codes to secure future communications.

Random number: One of a sequence of numbers considered appropriate for satisfying certain statistical tests or believed to be free from conditions that might bias the result of a calculation.

Simple Secure Exchange of Random Numbers

Figure 2:
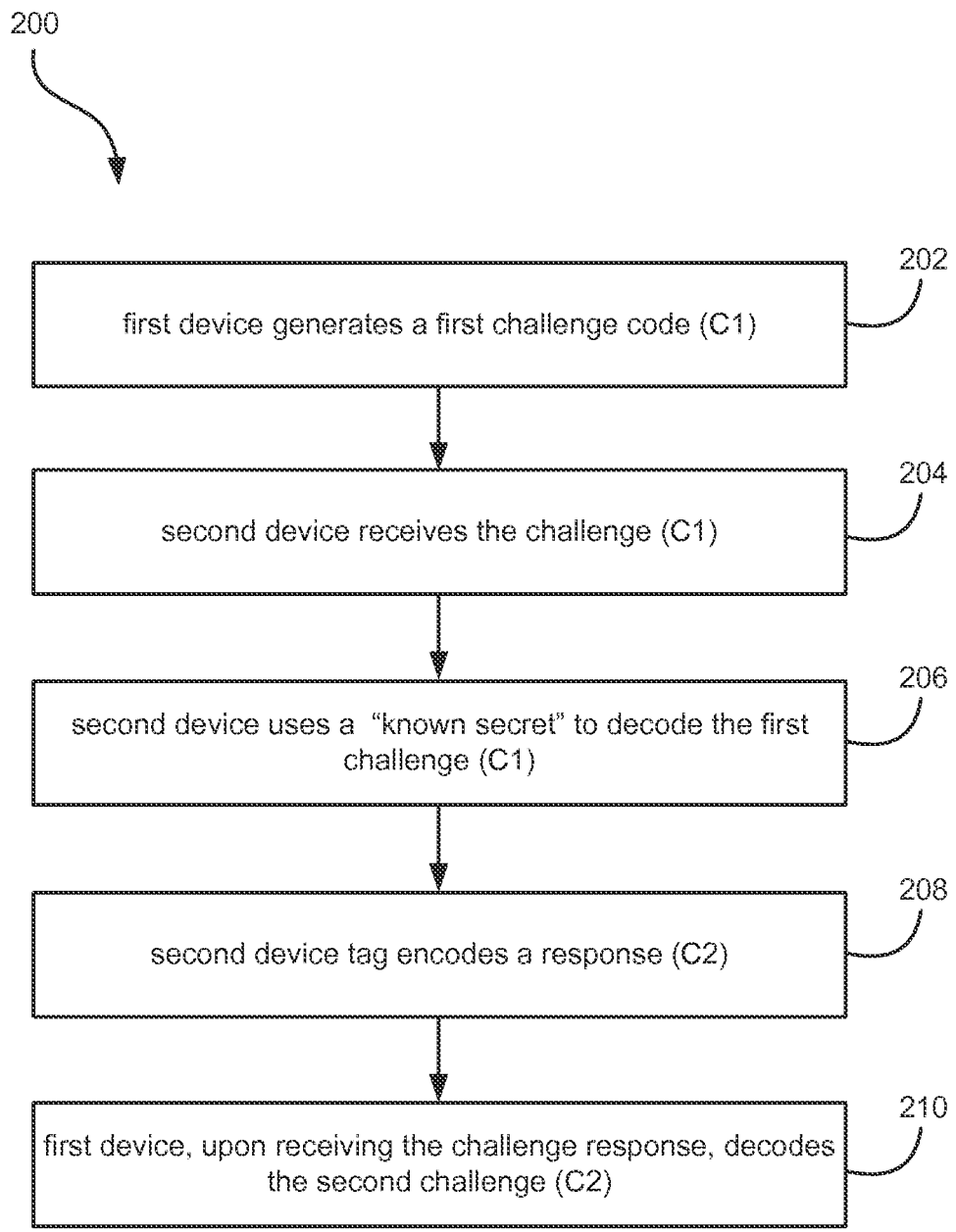
FIG. 2 is a flow diagram of a method for simple, secure exchange of random numbers according to one embodiment.

A first embodiment provides a process for simple, secure exchange of random numbers. FIG. 2 is a flow diagram of a general overview of the method 200. In operation 202, a first device, e.g., a reader generates a first challenge code (C1) including a random number. In operation 204, a second device, e.g., a tag, receives the challenge (C1). In operation 206, the tag uses a "known secret" to decode the first challenge (C1) and extract the random number from the first device. Using this decoded random number from first device, the tag encodes a response (C2) in operation 208, the response (C2) including a random number from the second device, In operation 210, the first device, upon receiving the challenge response (C2), decodes the second challenge (C2) and retrieves the random number of the second device.

The "known secret" can be a secret code (e.g., sequence of bits) and herein referred to as a "password" known to both the reader and tag. To share the password, the tag can be initiated in a known, secure environment and loaded with the password so there is almost no chance of the password being captured by a third party. Preferably, each tag has a unique password, which can correspond to the serial number of the tag, etc. For instance, the manufacturer of the tag can set a password for each tag. A subsequent purchaser can enter the original password, and rewrite the tag with new password, thereby allowing the current owner to control ownership of each tag. The tag can be configured to not function in secure mode until the proper password is presented.

The reader is also loaded with the passwords for each tag anticipated to be in communication with the reader. Note that because the reader is typically more complex than the tags, the reader can at any time download the passwords from a computer, the internet, a wireless link to a remote source, etc.

Figure 3:
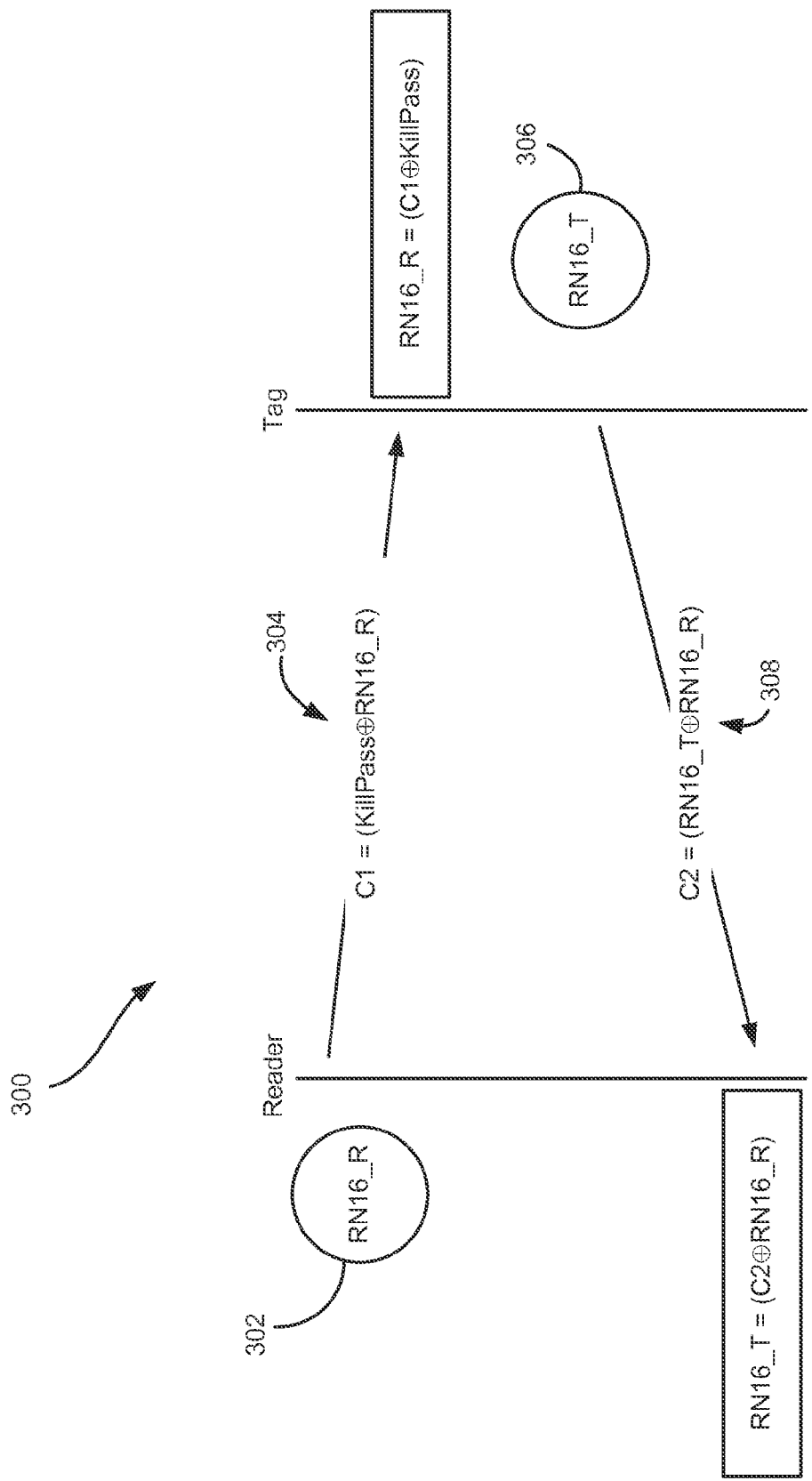
FIG. 3 is a flow process of an illustrative sequence of events in a process for simple, secure exchange of random numbers according to one embodiment.

FIG. 3 graphically depicts an illustrative sequence of events 300 in a process for simple, secure exchange of random numbers. The reader generates a first random number 302 locally. In this example, the random number 302 is a 16 bit random number (RN16_R), but can be of any size. One skilled in the art will understand the increased processing requirements that accompany random numbers of increased size.

One way to generate a 16 bit random number is to spin an oscillator having 16 states and stop at random to create, for example four random bits. This may be repeated as necessary to generate 16 or more seedless numbers. White RN16_R can be generated by any suitable mechanism, because the reader is more complex than the tag, i.e., more capable than the tag, the reader can generate a random number that is of higher quality (cryptographically) than that generated by the tag. Preferably, the random numbers are not generated from a seed, as an imposter could potentially cause the tag or reader to restart, which would start the sequence over again and the password could be extracted by "brute force" analysis of the repeating sequences.

The reader then Exclusively OR's ("XOR's") the first random number (RN16_R) with a password corresponding to the particular tag to be communicated with to generate a first challenge code (C1) 304, where:

$$C1=(RN16\_R \oplus KillPass(31:16))$$

In this example, the password is a 32 bit Kill password upper half (31:16), but can be of any suitable size and content per the desires of the programmer.

Exclusive ORing is preferred because it provides good security but can be implemented with only four transistors per bit. This simplicity makes the disclosed method very suitable for RFID tags, in that the processing circuitry can be minimized.

Exclusive ORing provides good security in that any number XORed against a random number is indistinguishable from a larger random number, i.e., the data (RN16_R and KillPass) in the XORed challenge is effectively hidden. To put it another way, scrambling the random number with a password hides both the password and the random number itself.

The reader then transmits the first challenge code (C1) 304 to the tag.

The tag receives the first challenge (C1) 304 and uses its copy of the Kill password MSB half to decode C1 by performing an inverse XOR function on the first challenge:

$$RN16\_R(@Tag)=(C1 \oplus KillPass(31:16)).$$

The tag generates a random number (RN16_T) 306, either before or after receiving the first challenge (C1) 304. The tag then combines this second random number (RN16_T) 306 with the decoded first random number (RN16_R) from the reader in the first challenge (C1) 304 using an Exclusive OR function to generate a second challenge (C2) 308:

$$C2=(RN16\_ \oplus RN16\_T)$$

The second challenge code (C2) 308 is then transmitted to the reader.

The reader receives the second challenge (C2) 308 and uses its previously generated random number (RN16_R) 302 to perform an inverse Exclusive OR on the challenge (C2) 308 and retrieve the tag's random number 306:

$$RN16\_T(@RDR)=(C2 \oplus RN16\_R)$$

Note that the exchange does not necessarily need to be performed in the order set forth above. For instance, the tag could generate its random number (RN16_T) 306 prior to receiving the first challenge, etc.

Now the reader has a secure version of the tag's RN16_T 306 and the tag has a secure version of the reader's RN16_R 302. Additional exchange cycles may be completed to exchange "larger" blocks of data using new versions of the random numbers from the reader and/or the tag. More information on such exchanges shall be set forth below.

Additionally, because the reader is more capable than the tag, the random number (RN16_R) from the reader can be cryptographic in nature (higher quality) while the random number (RN16_T) from the tag doesn't have to be (i.e., can be a pseudo random number, a random number based on a seed, etc.) because the tag's random number (RN16_T) is encoded with the higher quality cryptographic number (RN16_R) and is therefore much more secure. In other words, the high quality random number from the reader protects the lower quality random number from the tag. However, it is preferable that the tag also generate as high a quality of random number as possible.

This exchange protocol requires only the addition of a reader RN16 and in some cases, an exchange command. Additional commands may be used to exchange portions of the protocol in some specifications. Note that this exchange protocol does not rely on a KillPassword, but on "some" secure token. Other tokens could be used as well, including a token for the express purpose of the exchange protocol.

The process set forth above thus provides a mechanism for secure data. transmission. There are a number of ways to attack a system. Typical examples include use of a rogue reader, use of a rogue tag, acting as a man in the middle which reads the information and gains experience, and denial of service.

The easiest way to break a code is to control the sequence, because then an imposter can repeat portions of the sequence over and over again, extract information from the repeating sequence, then use that information to break other parts of the code until ultimately the imposter learns how to encrypt the data and even communicate with the reader or tag directly. For example, assume a random number only came from the reader. Then theoretically, an imposter tag would have a hard time breaking the sequence because nothing repeats. If the tag does not have the password, it could not break the sequence. If the imposter tag tried to break it, the exchange starts with different random number, and would have a different sequence. So there is no consistency as to what would happen. Now assume an imposter reader is attempting to break the sequence. Because the reader is the player supposed to generate a random number, the imposter reader would generate the same number over and over to query the tag. From the tag's responses, the password can be extracted.

Because the process described above uses two random numbers (one from the reader and one from the tag), no imposter, whether tag or reader, can achieve a consistent result because the exchange always includes a random number from the other side. Thus, an imposter can never control the exchange, as the randomness cannot be removed from the process because some of the randomness is from reader and sonic is from tag, and the process cannot be forced to repeat itself.

Simple Secure Tag/Reader Authentication Using Cyclical Redundancy Checks (CRCs)

There has thus far been presented a system and method where if the password is correct, an exchange can happen. If either the tag or reader is nefarious (i.e., uses the wrong password), the exchange fails, nothing happens, and the password remains safe.

Building on the above, it is desirable to authenticate the exchange to ensure that the tag or reader is who it claims to be rather. than an imposter. To that end, the present invention is also capable of verifying that the challenges are authentic, i.e., have not been modified by an imposter. Particularly, the present invention calculates and adds a CRC to the packet to ensure that the correct random number was received. So instead of having a pure random number where any result would be acceptable to the tag, a CRC is added so that only the original random number will match the CRC value.

Imagine a scenario in which the wrong reader sends a random number XORed against a password. The tag uses its password, which is does not match the reader's password, but extracts what it thinks is the correct random number. The passwords don't match so the tag stops. The point is, the tag has no way of knowing whether it is talking to right reader and doesn't know it has the right random number or not. By adding a CRC on the random number, the tag can verify that it has received the proper. random number. If the CRC indicates that the tag has received a good packet, the tag will know it is communicating with the proper reader (authentication) rather than a nefarious reader.

The process can be repeated for the return transmission. The tag can generate a CRC for its own random number, XOR it with the tag's random number, and send back a second challenge containing a CRC. When the packet comes back to the reader, the reader can confirm it has received the proper random number, which will only occur if the tag had the password, had properly decoded the readers random number, and the CRC matches.

CRCs and XORs are easy to implement in hardware, so this new process is ideal for RFID systems.

Figure 4:
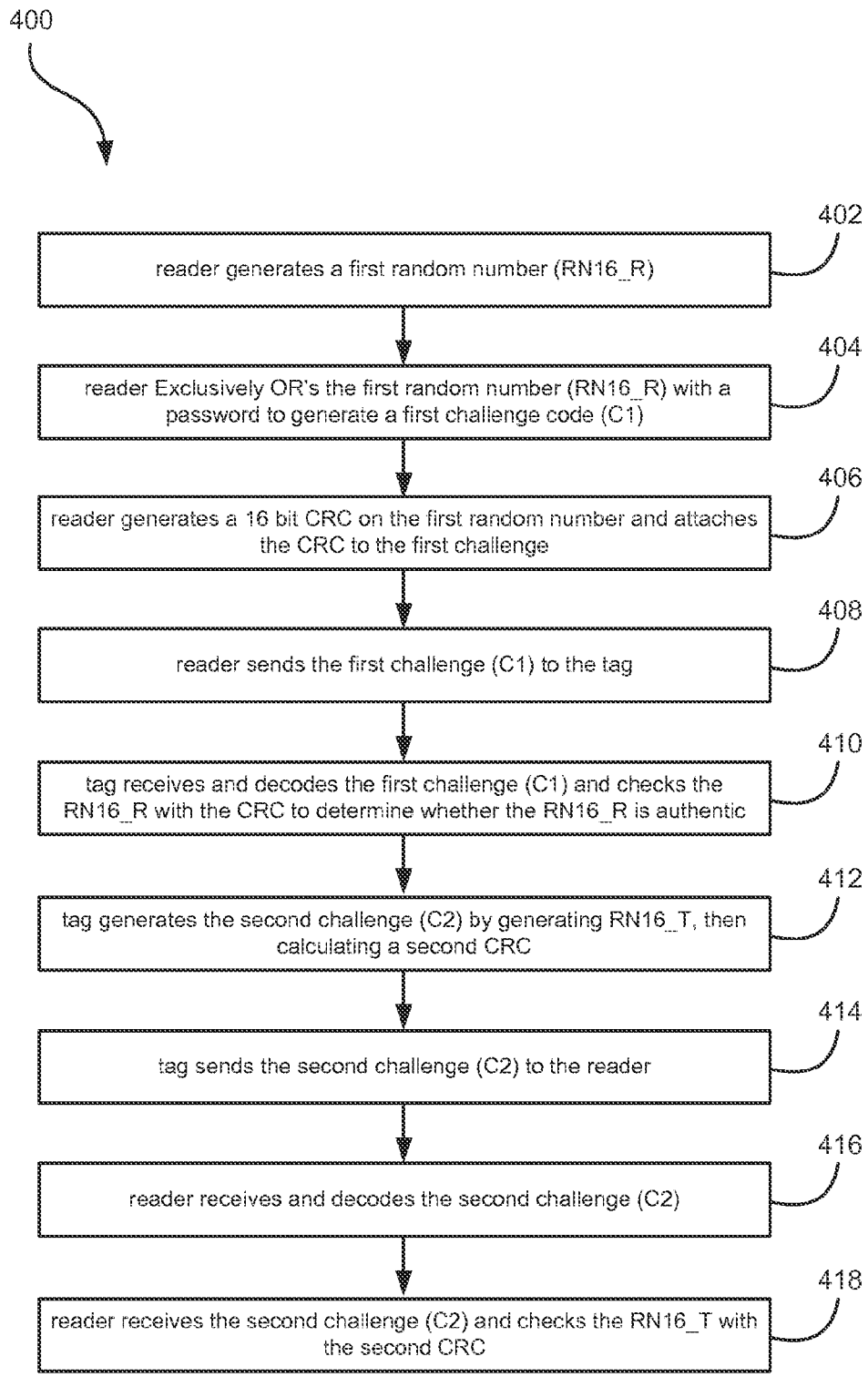
FIG. 4 is a flow diagram of a method for simple, secure exchange of random numbers with CRC verification according to one embodiment.

FIG. 4 depicts a process 400 in which CRCs are added to the exchange. Again, it should be noted that the order that the operations are performed is not critical and can be varied where not dependent upon a prior operation. In operation 402 the first device, e.g., reader, generates a first random number (RN16_R). In operation 404, the reader Exclusively OR's the first random number (RN16_R) with a password to generate a first challenge code (C1). In operation 406, the reader generates a 16 bit CRC on the first random number and attaches the CRC to the first challenge:

$$C1=(RN16\_R \oplus KillPass(31:16), CRC(RN16\_R))$$

Note that the CRC can be of any suitable number of bits.

Alternatively, the reader can generate a 16 bit CRC on a combination of the first random number and the password. The combination can be merely be a sequential combination of the random number and password as in:

$$C1=(RN16\_R \oplus KillPass(31:16), CRC(RN16\_R+KillPass))$$

or vice versa. The combination could also be the result of XORing the random number and password, as in:

$$C1=(RN16\_R \oplus KillPass(31:16), CRC(RN16\_R \oplus KillPass))$$

The reader then sends the first challenge (C1) to the second device, e.g., tag, in operation 408. In operation 410, the tag receives and decodes the first challenge (C1) and checks the RN16_R with the CRC to determine whether the RN16_R is authentic, i.e., has not been modified by an imposter. If the CRC doesn't match the RN16_R, the tag will not accept the challenge (C1).

In operation 412, the tag generates the second challenge (C2), and calculates and attaches a CRC of the tag's random number to the second challenge (C2):

$$C2=(RN16\_R \oplus RN16\_T, CRC(RN16\_T))$$

In operation 414, the tag sends the second challenge (C2) to the reader. In operation 416, the reader receives and decodes the second challenge (C2). In operation 418, the reader receives the second challenge (C2) and checks the RN16_T with the second CRC. If the CRC doesn't match the RN16_T, the reader will not accept the challenge (C2).

For subsequent data transmissions protected by random numbers, the reader and tag can continue to use CRCs to authenticate the transmissions.

In a variation on the above, the reader can combine the CRC with its random number (RN16_R) prior to XORing with the password. Similarly, the tag can combine the second CRC with its random number (RN16_T) prior to XORing with the reader's random number (RN16_R) or random number plus first CRC. These would create an even larger number, which would be harder to decode by a nefarious party. In other words, to the extent that a random number is not truly random, it would eventually be possible to determine the password. However, by running a CRC on the random number, the CRC on the random number is near random itself and so would require even more processing power and time to break the encryption.

Now a level of authentication has been added to the exchange.

Circuit Implementing Random Numbers for Secure Data Exchange

Figure 5:
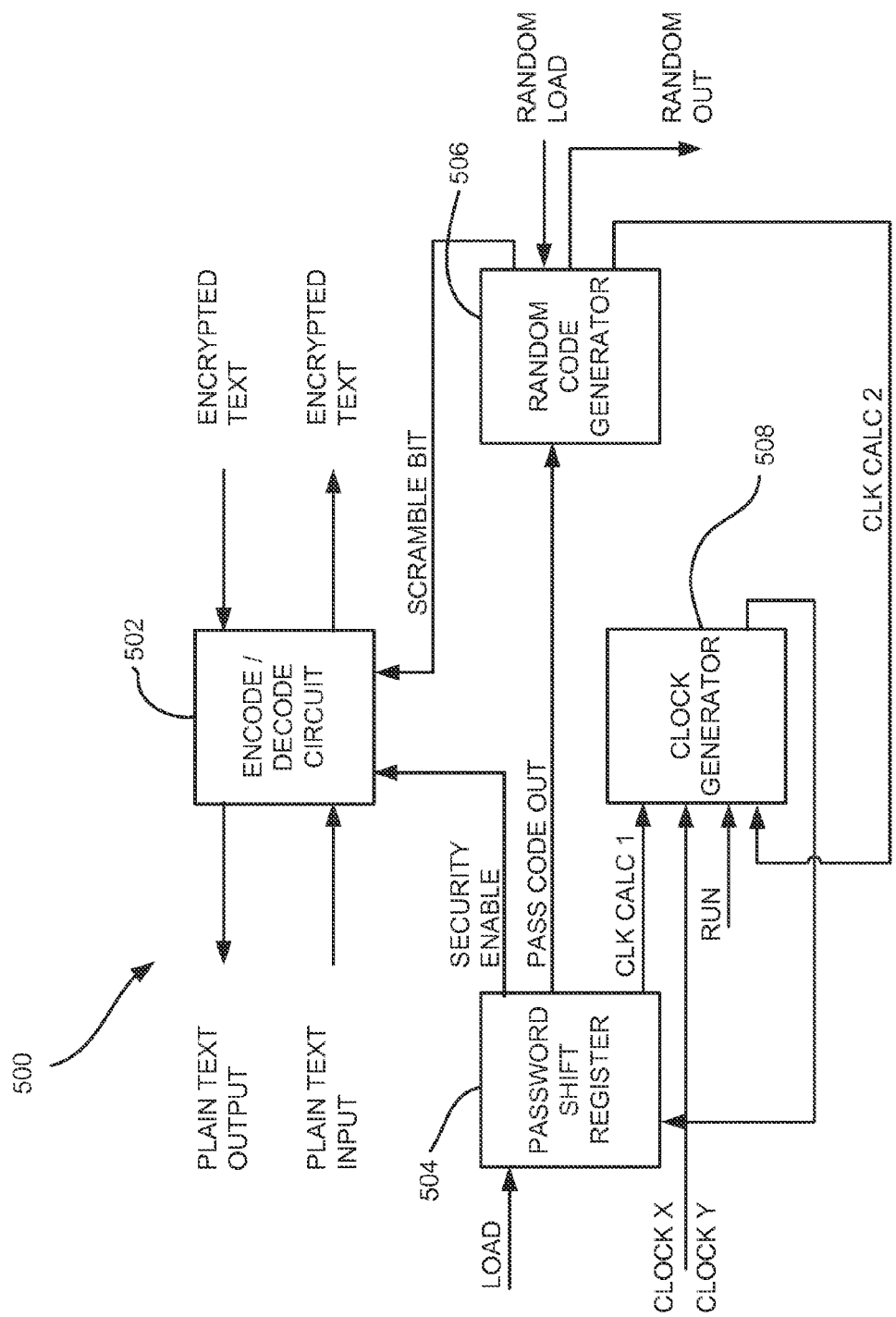
FIG. 5 is a top level block diagram of a security circuit according to one embodiment.

FIG. 5 is a top level block diagram of a circuit 500 that will take a plain message and using the methodology described herein, encode the message into a ciphered message. This ciphered message may then be transmitted to the receiver in a non-secure method. At the receiving end, the same algorithm is applied to the cipher message to convert it back to a plain message. This circuit can be implemented in under 1000 gates, and potentially under 400 gates.

Again, this example is not intended to be an exhaustive description of each potential configuration, but to show how one potential circuit may be configured. Variables may have initial conditions, which when chosen, have better results than other initial values. These variables and configurations are for illustration purpose only, and do not suggest the only values which may be utilized.

The circuit 500 includes four blocks: an encode/decode block 502, a password shift register block 504, a random code generator block 506, and a clock generator block 508. The encode/decode block 502 is responsible for the actual conversion from plain message to cipher message in both the forward (transmitting) and the backward (receiving) directions. It uses as inputs the plain information and outputs encrypted text if the security enable is active (i.e. asserted). In the reverse direction, the block takes as input, encrypted information and if security enable is asserted (i.e. active), decrypts the information. Additionally the encode/decode block 502 requires the input "scramble bit" which is used to encrypt or decrypt information.

The password shift register block 504 holds the "secret" password. For discussion purposes a size of 32 bits has been selected for this secret password. This secretly generated value is loaded into the security circuit in a secure method. This is the "hidden key." This block also includes a pass clock, and a password load signal. The password shift register 504 produces a security enable signal, a clock calculation bit, and an intermediate pass code out value. The pass code out signal is used in further calculation of the encryption algorithm.

The random code generator block 506 loads the reader RN16 and the tag RN16 values. For discussion purposes a size of 32 bits has been selected for this random number key. The important fact of this value is that to create the full key, a portion of the random key is determined by each entity. For the purposes of discussion, we limit the number of entities to two, and further described them as transactor A and transactor B. In this case, each transactor (A and B) would provide some portion of the RN key, which when combined create the RN key. For illustration, we allow each transactor to provide 50% of the key or 16 bits each. As with the password shift register 504, a load signal is also present. The product of the random code generator 506 is the scramble bit and clock calculation bit. It is also preferred that a known number of periods, e.g., ≥128, be applied to this system prior to actual use to encrypt or decrypt text in block 502. This initialization period must be a synchronized number of cycles known and agreed upon by all transactors involved in this secured communication.

Figure 6:
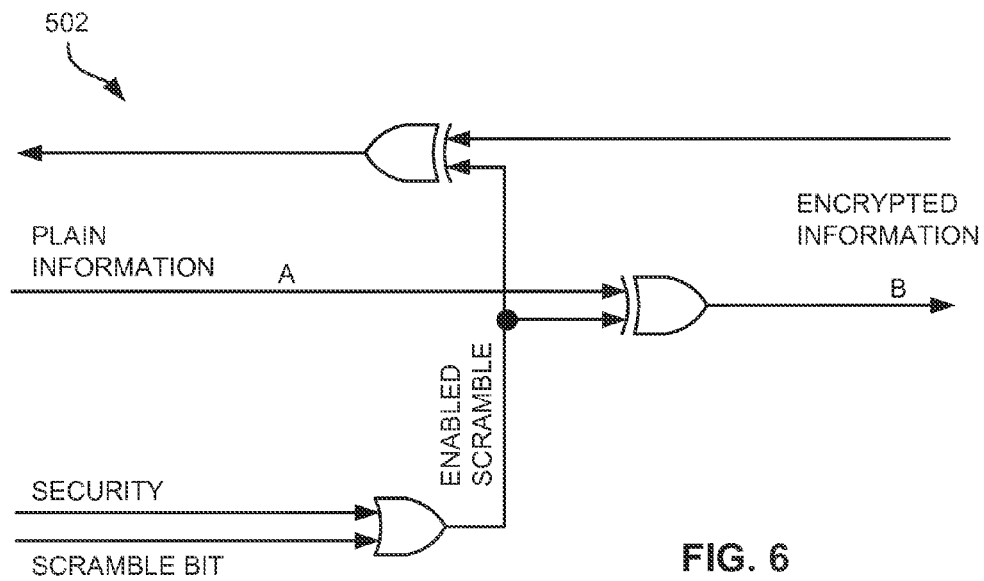
FIG. 6 is a top level diagram of the encode/decode block of the circuit of FIG. 5.

FIG. 6 is a top level diagram of the encode/decode block 502. The encode/decode block 502 is comprised of two directions: in and out. Both directions have the need to encrypt and decrypt the incoming or outgoing information. In creating cipher information from plain information, going from the left hand side of FIG. 6 to the right hand side, plain information is presented on incoming signal A. The signal A is combined with the enabled scramble bit using an Exclusive OR function. If the scramble bit is not asserted or the security enable bit is unasserted, the plain information is passed from the input (A) to the output (B). When Security is enabled (asserted) and the scramble bit is also asserted the value of A is XORed with A, effectively inverting the output state at signal B. (See Table 2).

TABLE 2

XOR truth table

| Signal A (in 1) | Enabled scramble bit (in 2) | Signal B (out) |
|---|---|---|
| 0 | 0 | 0 |
| 0 | 1 | 1 |
| 1 | 0 | 1 |
| 1 | 1 | 0 |

This effectively scrambles or encrypts the information because the calculated value of the enabled scramble bit is unknown by third party observation of the output signal B. It is the calculation of the scramble bit which provides the security algorithm. Without knowing or being able to calculate the scramble bit, the encrypted information is secure. The converse is also true. By using the calculated value of the enabled scramble bit, the incoming signal can be correctly decrypted. Because the scramble bit is calculated the same way by both transactors (transactor A and transactor B), each is able to encode and decode the encrypted information. Care must be taken when applying information to either the right hand side or left hand side for encryption or decryption, to provide only valid information while the run signal is asserted or during active encrypt or decrypt periods. Run should be asserted once for each new value of the incoming information such that it generates one value of outgoing information. Synchronization between the sending transactor and receiving transactor require information and the run signal to operate in a one for one manor (i.e. each run period should be applied to the next single value of information). For purposes of this discussion, the term Data Clock will apply to this period. Therefore, for each Data Clock period, a new value of scramble bit and a new value of incoming information need to be present when the run signal is asserted (active). No information is translated from encrypted to decrypted (or visa versa) during periods when run is inactive. Run may remain inactive for an unspecified number of Data Clock periods.

Figure 7:
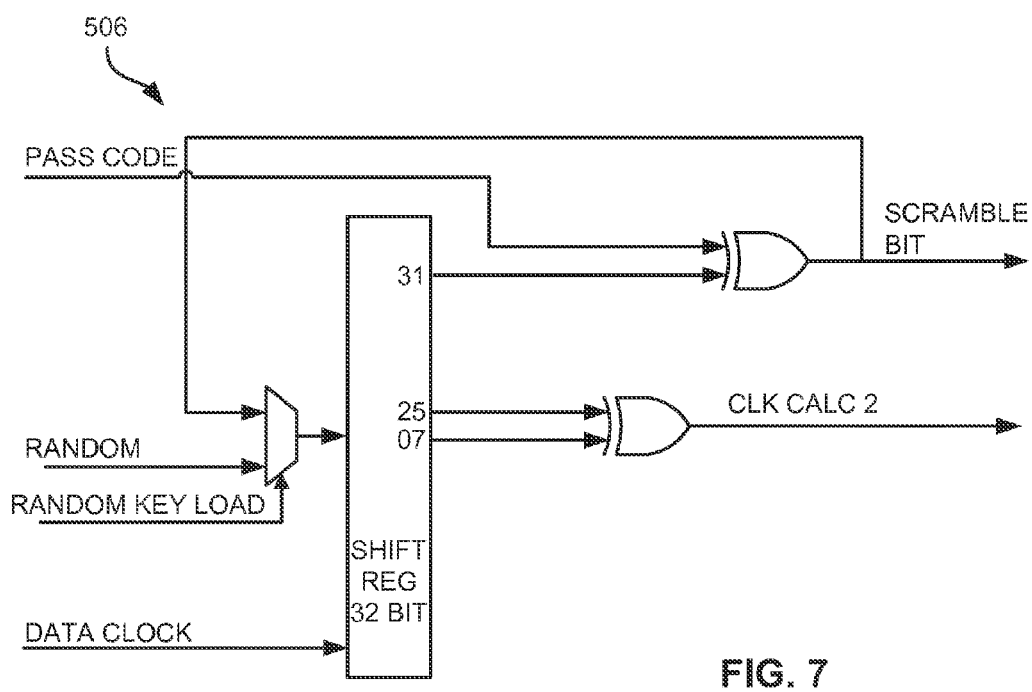
FIG. 7 is a top level diagram of the random code generator block of the circuit of FIG. 5.

FIG. 7 is a top level diagram of the random code generator block 506. The random code generator 506 creates the scramble bit signal. This block is initially loaded and "seeded" with the RN key, by preloading the shift register to initialize the algorithm. Some portion of this code comes from the local transactor and some portion from the remote transactor. It is combined in a known and synchronized fashion creating the RN key which is then loaded into the random code generator's shift register. The shift register is then clocked or run for a known number of cycles, thus, initializing the encryption algorithm. At this point the random code generator 506 is ready to help calculate the scramble bit to encode or decode information.

The shift register shown in FIG. 7 is 32 bit. The 32 bit value was selected for illustration purposes only. Larger or smaller sizes may be used.

For each Data Clock the shift register moves in a left shift direction, making bit 0 the new bit 1, the old bit 1 the new bit 2. This is a logical left shift operation. This continues until all bits are exhausted or all Data Clock periods cease. The most significant bit (MSB), bit 31, is pushed off the end of the shift register and is discarded. In order to not run out of incoming bits, the scramble bit is loaded into the shift input, and on the next period becomes the new bit 0.

The other signal which is important is the Clk Calc 2 signal. By using two bits from the shift register and combining them using an XOR function, the Clk Calc 2 signal is created. This signal then goes to the clock generator circuit 508.

Figure 8:
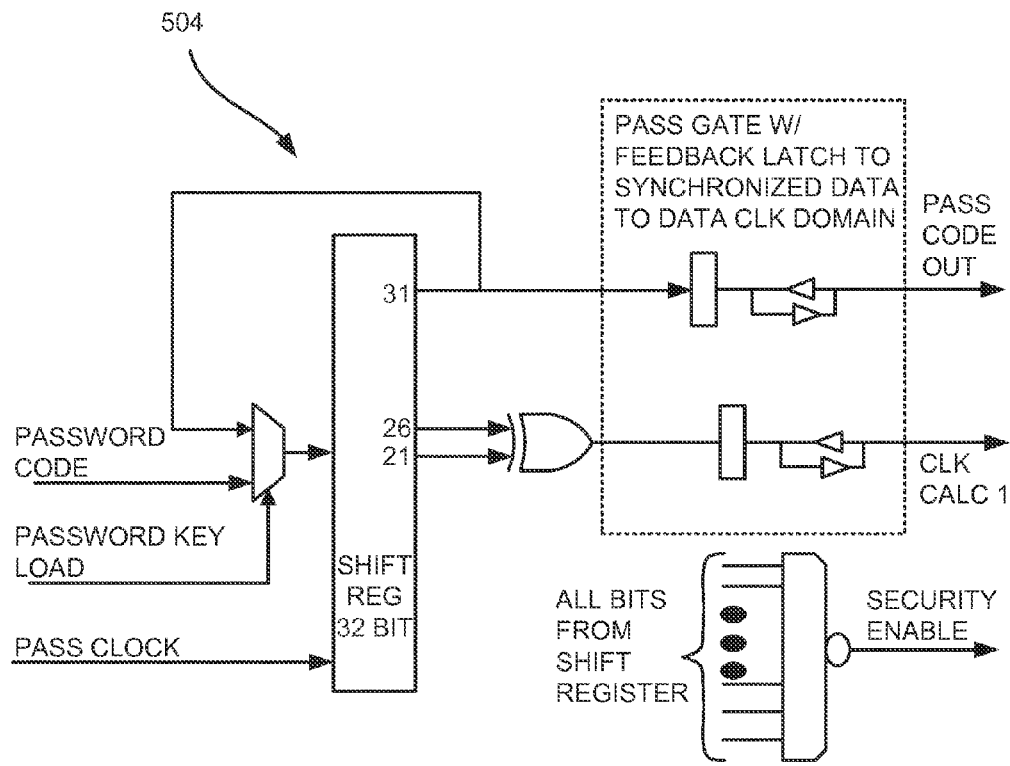
FIG. 8 is a top level diagram of the password code generator block of the circuit of FIG. 5.

FIG. 8 is a top level diagram of the password shift register block 504. The password shift register 504 works in much the same manner as the random code generator 506 with a few exceptions. First, the MSB of the shift register is not discarded, but a circular shift is performed. This means that the MSB bit is loaded, on the new period, into the least significant bit (LSB). This is the normal operating mode.

The initial value for the password shift register 504 does not come from a combination of transactor keys, but from a secured valued preloaded in some manor which does not compromise the security of the shared password (secret key).

Additionally the shift register in the password shift register 504 operates using PASS CLK and not the Data Clock. This allows known variations and relations to be used to operate each shift register, with the potential desire to run each clock at related but different rates. if a value of all zeros resides within the shift register the security enable bit is then unasserted and the encryption/decryption of information is disabled. The use of two shift register bits is used to create the Clk Calc 1 signal in a manner similar to the Random Code Generator block 506.

The password shift register 504 creates the PASS Code out signal based on the MSB from the shift register. Because of the potential of multiple clock domains, some amount of synchronization, of this signal, is required. If PASS Clock and Data Clock are different, non-phase locked clocks, this could potentially create a metastability case between the two domains. Synchronizing of the PASS code out signal is required for the Data Clock domain.

Figure 9:
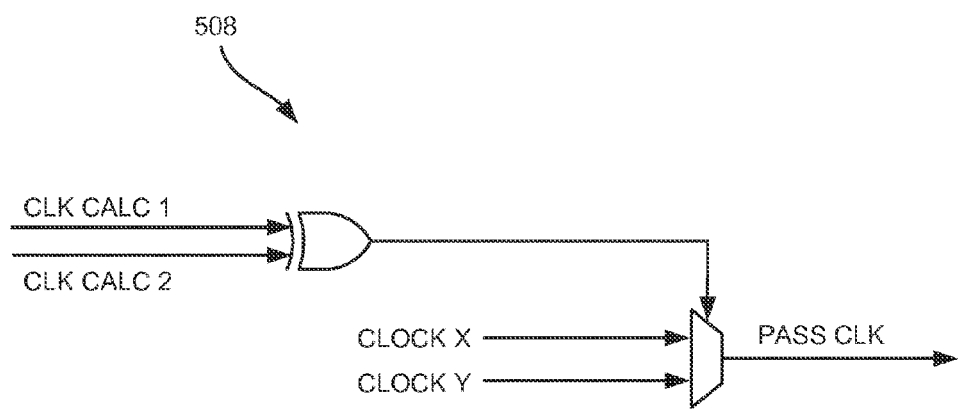
FIG. 9 is a top level diagram of the clock generator block of the circuit of FIG. 5.

FIG. 9 is a top level diagram of the Clock Generator block 508. This block 508 creates the PASS Clock used by the password shift register 504. It also controls the DATA clock for the random code generator 506. Proper implementation is required and care must be taken in its implementation of this section, to follow good clock design practices. Selection of clock frequency is determined by the Clk Calc1 and the Clk Calc 2 signals. The two signals Clk Calc1 and Clk Calc2 are combined (in this example a simple OR function is used) and selected from potentially different generated clocks to supply as the PASS Clk.

Based upon a system reference clock, Clock X and Clock Y may be at different frequencies. The frequencies may be related or have a directional component, or vary with the direction of data transfer between the reader and tag. A related clock would be some multiples of the system reference clock. If for example the system clock runs at a high rate, Clock X may divide the system reference clock by a value X while the Clock Y period may divide the system reference clock by a factor of Y. For example, if the system reference clock is 2 Mhz, then a divide by 2 would yield a Clock X of 1 Mhz and a divide by 4 would yield a Clock Y of 500 Khz.

If the communication link is not symmetrical (that being the information from transactor A to transactor B travels at a rate M, and transactor B to A at a rate of N) periods of Clock X and Clock Y may correspond to these transmission rates or frequencies. If different, it further confuses the casual observer, by also adding a component of directional duration into the calculation of the encryption algorithm, For example, if the forward direction (transactor A to transactor B) runs at a rate of 160 Khz, and the reverse direction (transactor B to transactor A) run at a rate of 8 Khz, then these values may be used for the periods of Clock X and Clock Y respectively.

Figure 12:
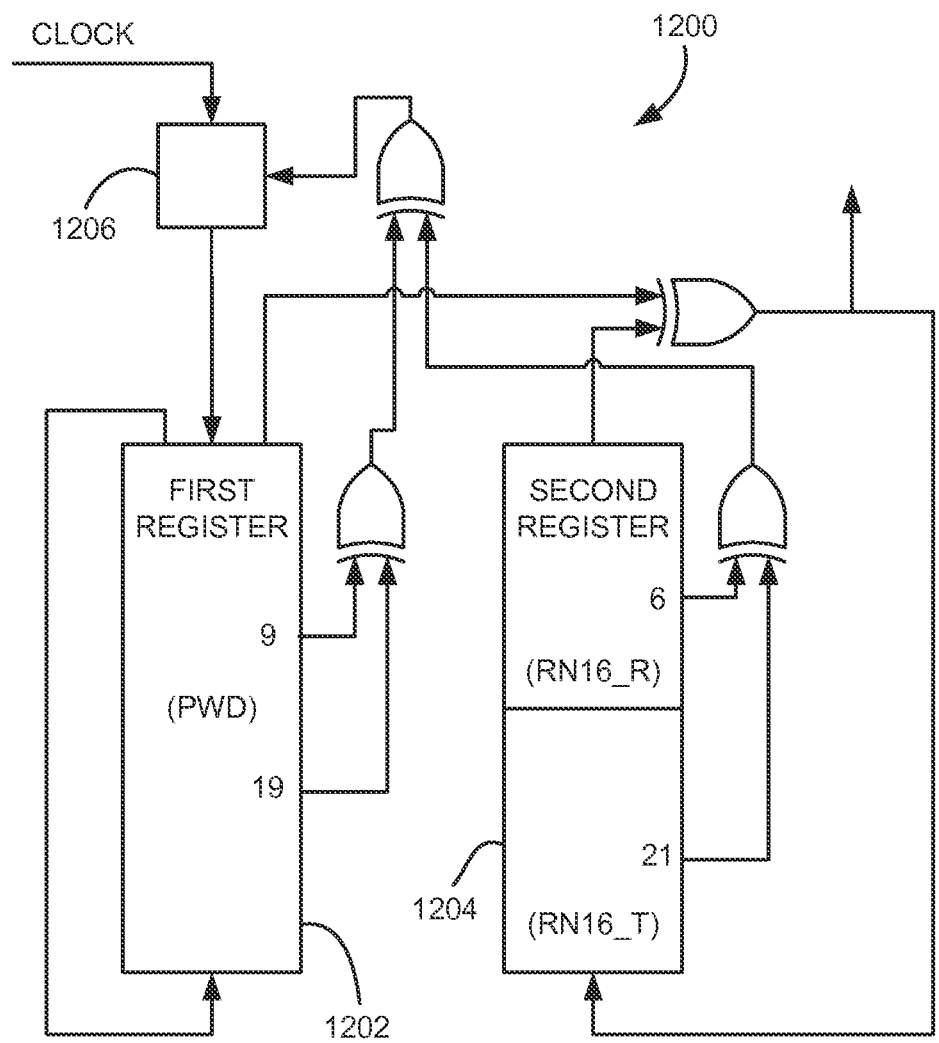
FIG. 12 is a simplified diagram of a circuit for generating DES coding with variable cycle offset.

From the above sections, Clk Calc 1 and Clk Calc2 are generated based upon the selected bits of the individual shift registers. By combining these bits using an XOR function, random, but calculated values are generated. These values are then combined (using an XOR function) to select between different clock frequencies for shifting the Password Code shift register. By shifting the register in a pseudo random order, random to the uninformed casual observer, a high level of security is maintained. FIG. 12 and associated description expand on this concept.

Additionally, shifting of the Password Code shift register can be halted altogether, periodically, or irregularly, to further improve encryption. For instance, the clock generator 508 could include a circuit that halts the clock when Clk Calc 1 or Clk Calc2 include a particular sequence of bits. The starting and stopping affects how the data output from the registers is XORed, making the sequence based on the numbers more complex, i.e., harder to break.

It should also be noted that the rates at which the password code generator shift register and the random code generator shift register operate may be selected in a number of different fashions. One option is to use pre-determined, calculated values, such as valued divided down from a system reference clock, or requiring a different or the same value for both clocks. Another option is under the direction of a non-symmetrical communication link, where the transmission of the transmit clock period differs from the receive clock period. These clock periods may be used for shift register clock rates. A combination of these can also be implemented.

As part of the initialization of the clocks, shift registers, and "scrambling" the initial choices for key codes, a number of cycles should be run. This effectively scrambles the information contained within the two shift registers.

Figure 10:
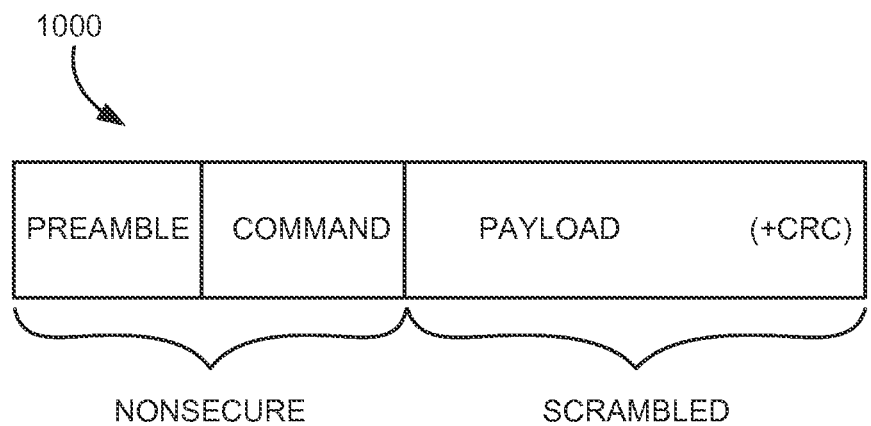
FIG. 10 is a graphical depiction of a packet of data.

Method and Circuit to Use Reader Random Number and Tag Random Number+Password to Generate Seedless Pseudo-Random Numbers FIG. 10 illustrates a packet of data 1000 transmitted between the transactors, assumed here to be a reader and a tag. Each packet includes a preamble, a command (e.g., 8 bit command), and payload. The preamble, for example, tells the tag to spin up its oscillator to a certain frequency and then start. The command instructs the tag to perform some function such as a read, write, acknowledge, select, send, etc. the payload can be any type of data desired to be transmitted, retrieved, CRC, etc. The length of the command or preamble can also be used to indicate the type of encryption. For instance, an 8 bit command indicates one type of encryption, while a 9 bit command indicates another type of encryption. The net result is that the time to decrypt the data can be reduced as the receiving device can determine which type of encryption to apply. This also enhances overall security by further increasing the apparent randomness of the exchange.

The payload can include passwords and other data, which are sent encrypted using the methodology presented herein. The preamble and command are nonsecure, transmitted in unencrypted form, so security in the recipient is bypassed. However, the payload is encrypted. As mentioned above with reference to FIG. 6, a bit (0) in the command turns security off for the command portion. However, the payload data itself is used to enable or disable security for the payload portion. The scramble bit appears to the plain eye as random. As long as it is synchronized at the reader and tag, the security method functions properly.

Every time a secure link is initiated, and security is enabled, new random numbers are generated. To initiate communication between the tag and reader, the reader queries the tag for its identifying information. The tag sends back its identifying information and the reader selects the password associated with that particular tag. The exchange process then starts as set forth above. The reader indicates that it wants to initiate a secure transaction. The reader sends its 16 bit random number (RN16_R). The tag acknowledges the command and sends back its 16 bit random number (RN16_T). The random numbers are loaded in registers. The reader sends a command with a scrambled payload, which may or may not include a CRC. If the payload is not successfully descrambled, or the CRC doesn't match the associated data, the tag won't respond. If the payload is successfully descrambled, a series of communication exchanges occurs.

Figure 11:
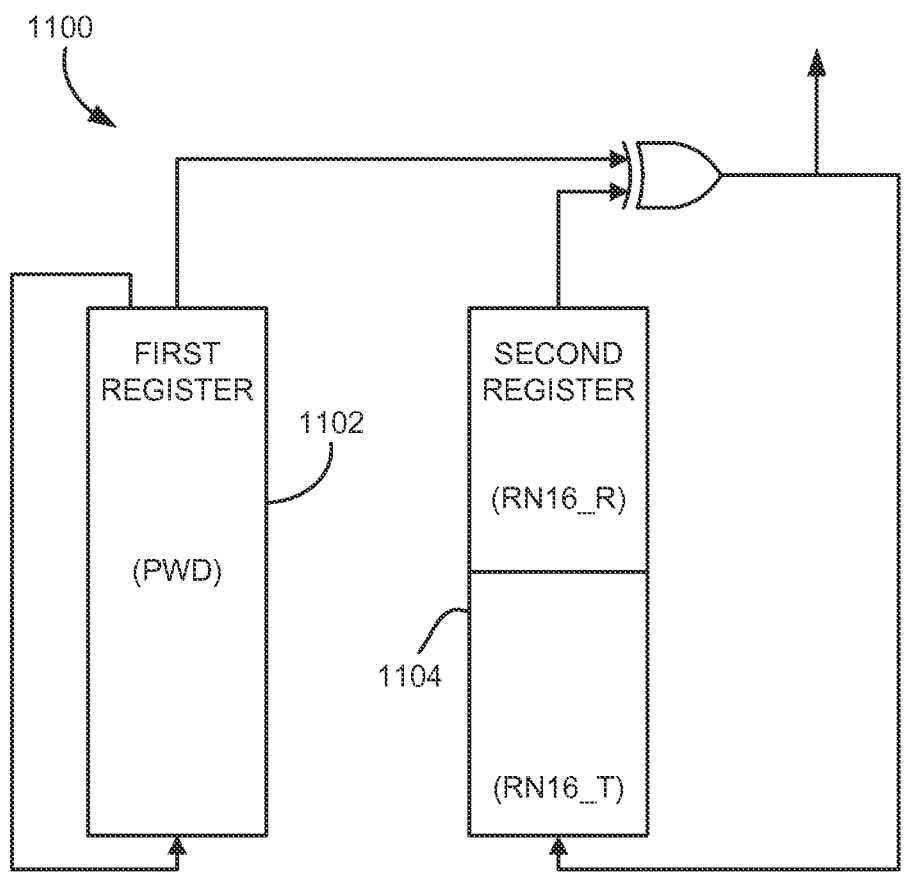
FIG. 11 is a simplified diagram of a circuit for generating pseudo-random numbers.

FIG. 11 is a simplified diagram of a circuit 1100 for generating pseudo-random numbers. The reader and tag each have two 32 bit shift registers 1102, 1104, similar or the same as the registers shown in FIGS. 7 and 8. The first register 1102 contains the 32 bit password. The second register 1104 is loaded with the 16 bit RN16_R and 16 bit RN16_T. Next, a sequence is generated from the original random numbers and password However, if the registers merely used the password and the same random numbers, shifting a bit each cycle, the sequence would repeat every 32 cycles. To avoid this, the random numbers are essentially only used once. In the first cycle, the output of the registers 1102, 1104 are XORed, and the result is output for transmission to the other device, but is also fed back into the second register 1104. In the next cycle, the (shifted) password in the first register 1102 is XORed with new number in the second register 1104 (result of previous XOR cycle). Thus the number in the second register 1104 is always changing so the sequence becomes long and complicated, i.e., impractical to break. In other words, an essentially nonrepeating sequence is generated. Each machine generates the exact same sequence so communication can take place.

Because the sequence begins with a known password and random numbers, it is not truly random, but rather is pseudo random. The sequence is seedless, because it begins with random numbers each cycle, the new random numbers being the result of the previous XOR function. Each time a sequence is started with a new random number, the seed changes and so the behavior of the sequence is unpredictable. Thus, the sequence appears to be completely random.

Method and Circuit for Generating Data Encryption Standard (DES) Coding with Variable Offset of Number of Cycles Controlled by All Three of Password, Reader Random Number, and Tag Random Number FIG. 12 illustrates a circuit 1200 for generating DES coding with variable cycle offset. DES coding generally includes the steps of taking a key and another number and XORing them in a first cycle. In the second cycle, the result from the first cycle is XORed against the key again. In the third cycle, the result from the second cycle is XORed against the key again. This is repeated for several cycles. The more cycles, the harder the encryption is to break. However, more cycles require more processing time. So there is a cost/speed trade off. Further, DES coding can be broken by using pairings of data and breaking the sequence cycle by cycle. Therefore, it would be desirable to create both a large number of cycles, and a variable number of cycles. The cycles should be irregular, e.g., not the same length.

Referring again to FIG. 12, a first register 1202 stores the password, and the second register 1204 stores the random numbers. Bits of information are extracted from the password and XORed with each other. Also, a bit from the RN16_T and a bit from the RN16_R are XORed. Then the results from XORing the password bits and random number bits are XORed. This result is fed into a clock generator 1206 to set a logic state of the generator 1206. In one state, the clock generator 1206 allows the clock signal to pass to the first register 1202. In the other state, the clock signal is blocked. The result is that the first register 1202 operates sporadically, typically at one half the rate as the second register 1204 (which operates continuously). Thus a staggered effect is created, and it is nearly impossible to back out the sequence.

To further enhance the encryption, one of the registers can be attached to a 2×, 3×, etc. clock.

As long as the receiving hardware has the password and the initial random numbers, the receiving hardware can reverse XOR the data to extract the data rather simply.

X Number of Precycles Prior to Outputting Data to Scramble

As mentioned above, a number of cycles with no output at all should be run as part of the initialization sequence to effectively scramble the information contained within the two shift registers. For example, 128 cycles can be run before allowing output, but can be any number of cycles. Even if a hacker tried to go back and extract the data, he or she would be missing the key 128 cycles. In the case where the random number register is always changing because it is being fed the XOR result of the first and second registers, and the clock is varying from the XOR staggering function on selected bits of the registers, the sequence is even more complex.

There has thus been described a security method and circuit that is simple to implement in hardware (e.g., 64 shift registers, <1000 transistors), and requires very little power. Data can be transmitted in parallel to operation of circuit, so speed is high.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   storing, in a first register of a first Radio Frequency Identification (RFID) device, a secret code associated with a second RFID device;
   generating, at the first RFID device, a first random number;
   storing, in a second register of the first RFID device, the first random number;
   storing, in the second register of the first RFID device, a second random number generated at the second RFID device;
   receiving output from the first and second registers;
   applying an exclusive OR (XOR) application to the output from the first register and the output from the second register to generate a random number sequence for data encryption;
   feeding the random number sequence into the second register of the first RFID device in a subsequent cycle, wherein a plurality of cycles are executed prior to transmission of data to the second RFID device; and
   transmitting a packet of data from the first RFID device to the second RFID device, the packet of data comprising a command and an encrypted payload, wherein at least a portion of the command is unencrypted,
   wherein the command is configured to instruct the second RFID device to perform a function,
   wherein the function is selected from the group consisting of: read; write; acknowledge; select; send; and combinations thereof.

2. A method as recited in claim 1, wherein a bit length of the command indicates a type of encryption.

3. A method as recited in claim 1, wherein the packet of data also includes a preamble, a bit length of the preamble indicating a type of encryption.

4. A method as recited in claim 1, wherein a portion of the command is encrypted.

5. A method as recited in claim 1, wherein the secret code is a 32 bit secret code.

6. A method as recited in claim 1, wherein the first random number and the second random number each comprise 16 bits.

7. A method as recited in claim 1, wherein the packet of data also includes an unencrypted preamble.

8. A method as recited in claim 1, wherein the packet of data is a plain message.

9. A method as recited in claim 1, wherein the first RFID device is a RFID reader, and wherein the second RFID device is a RFID tag.

10. A system, comprising:
a processor for exchanging data; and
logic integrated with and/or executable by the processor, the logic being configured to:
store, in a first register of a first Radio Frequency Identification (RFID) device, a secret code associated with a second RFID device;
generate a first random number;
store, in a second register of the first RFID device, the first random number;
store in the second register of the first RFID device, a second random number generated at the second RFID device;
generate a random number sequence for encrypting data, wherein generation of the random number sequence comprises: applying an exclusive OR (XOR) application to output from the first register and output from the second register; and
wirelessly transmit a packet of data from the first RFID device to the second RFID device, the packet of data comprising an unencrypted command and an encrypted payload,
wherein the command is configured to instruct the second RFID device to perform a function,
wherein the function is selected from the group consisting of: read; write; acknowledge; select; send; and combinations thereof.

11. A computer program product comprising a non-transitory computer readable medium having computer code embodied therewith, the computer code readable and/or executable by a processor to cause the processor to:
store, in a first register of a first Radio Frequency Identification (RFID) device, a secret code associated with a second RFID device;
generate a first random number;
store, in a second register of the first RFID device, the first random number;
store in the second register of the first RFID device, a second random number generated at the second RFID device;
generate a random number sequence for encrypting data, wherein generation of the random number sequence comprises: applying an exclusive OR (XOR) application to output from the first register and output from the second register; and wirelessly transmit a packet of data from the first RFID device to the second RFID device, the packet of data comprising an unencrypted command and an encrypted payload,
wherein the command is configured to instruct the second RFID device to perform a function,
wherein the function is selected from the group consisting of: read; write; acknowledge; select; send; and combinations thereof.

12. A method as recited in claim 1, further comprising:
transmitting a request from the first RFID device to the second RFID device for identification information associated with the second RFID device;
receiving, at the first RFID device, identification information associated with the second RFID device; and
selecting, at the first RFID device, the secret code associated with the first RFID device based on the received identification information.

13. A method as recited in claim 12, further comprising:
generating, at the first RFID device, a first challenge code using the first random number and the secret code via implementation of a XOR application;
transmitting the first challenge code from the first RFID device to the second RFID device;
receiving, at the first RFID device, a second challenge code from the second RFID device, wherein the second challenge code comprises: the second random number generated at the second RFID device, and the first random number extracted from the first challenge code by the second RFID device using the secret code via implementation of an inverse XOR application, wherein the second challenge code is generated at the first RFID device via implementation of a XOR application; and
extracting, at the first RFID device, the second random number from the second challenge code using the first random number via implementation of an inverse XOR application.

14. A method as recited in claim 13, further comprising transmitting a cyclic redundancy check from the first RFID device to the second RFID device for verification of the first random number.

15. A method as recited in claim 14, further comprising receiving, at the first RFID device, a cyclic redundancy check from the second RFID device for verification of the second random number.

16. A method as recited in claim 1, wherein the first register is a shifting register.

17. A method as recited in claim 16, further comprising controlling shifting of the first register using a clock signal, wherein the first register is clocked differently than the second register.

18. The system as recited in claim 10, further comprising logic integrated with and/or executable by the processor to cause the processor to: feed the random number sequence into the second register of the first RFID device in a subsequent cycle, wherein a plurality of cycles are executed prior to output of data.

* * * * *